July 15, 1969  H. B. NIELSEN  3,455,179

LINKAGE ASSEMBLY

Filed Dec. 26, 1967

INVENTOR.
Hans B. Nielsen
BY
Harness, Dickey Pierce
ATTORNEYS

United States Patent Office 3,455,179
Patented July 15, 1969

3,455,179
LINKAGE ASSEMBLY
Hans B. Nielsen, Birmingham, Mich., assignor to Vare Corporation, New York, N.Y., a corporation of Delaware
Filed Dec. 26, 1967, Ser. No. 693,537
Int. Cl. G05g 1/24, 1/02, 1/00
U.S. Cl. 74—503         5 Claims

ABSTRACT OF THE DISCLOSURE

A linkage assembly for operating a remotely located mechanism in response to preselected movement of an actuating device, the assembly comprising an elongated relatively light weight cylindrically configured actuating member extending between the mechanism and the actuating device; means operatively connecting one end of the actuating member to the mechanism and the opposite end of the member to the actuating device; an elongated helically configured housing member disposed in surrounding relationship with respect to the actuating member, the housing member comprising a series of helical convolutions spaced close enough together to guide the actuating member yet being spaced apart a sufficient distance to reduce weight and to permit moisture to drain from within the housing; one of the members being fabricated of a polymeric resin whereby to prevent corrosive adherence between the members.

---

The purpose of the above abstract is to provide a nonlegal technical statement describing the contents of the instant application so as to serve as a searching-scanning tool for scientists, engineers and researchers. Accordingly, this abstract is not intended to be used in understanding the principles of the present invention hereinafter described in detail, nor is it intended to be used as interpreting or in any way limiting the scope or fair meaning of the claims appended thereto.

Background of the invention

It has heretofore been the practice in the construction of passenger doors for automotive vehicles to provide some type of mechanical linkage internally of the door structures for operatively connecting the door locking or latching mechanisms with suitable manually engageable handle means projecting internally of the vehicle from the inner side of the door, such handle means thereby being selectively pivotable to and from positions effecting unlatching of the door. Such mechanical linkages have usually been in the form of rigid connecting links, rods and the like, which have been of configurations so as to provide the desired actuation of the latching mechanisms while being free from interference with the internal mechanisms provided in such vehicle doors for supporting, raising and lowering the associated windows or the like. Also, such mechanical linkages have had to be of a configuration conforming with the shape or contour of the vehicle body, as well as being of an economical, corrosion resistant and durable construction.

Although such linkage mechanisms have proved to be satisfactory in the past for accomplishing the desired interconnection between the interior vehicle door handles and the associated door latching mechanisms, recent emphasis on safety requires that such mechanisms do not effect opening of door latches upon side impact. Due to the size, conformation and complexity of the doors of modern automotive vehicles, it has become increasingly more difficult to design and fabricate suitable linkages of the aforesaid type while keeping within the limits dictated by safety regulations. More particularly, it has become an extremely difficult and expensive undertaking to design a satisfactory linkage mechanism which is of an extremely light construction yet will function effectively in operatively connecting a door handle with its associated latching mechanism and will not interfere with the window raising and lowering mechanisms incorporated in the vehicle doors.

In accordance with the principles of the present invention, the aforesaid difficulties encountered in providing a linkage mechanism for operatively connecting a door handle with the associated latching mechanism in a modern automotive vehicle door have been overcome. In particular, the present invention provides a novel relatively lightweight linkage assembly which is constructed so that it may assume various configurations within the door so as to operatively connect a door handle with the associated latching mechanism without interfering to any extent with the internal mechanisms normally incorporated in such doors.

Generally speaking, the linkage assembly of the present invention embodies an elongated flexible cylindrical actuating member which is connected at one end thereof to the door actuating handle and at the opposite end thereof to the associated door latching mechanism. The actuating member is operatively supported within a helically configured housing member comprising a series of convolutions which are spaced sufficiently apart to enable any moisture which may accumulate therewithin to drain out of the housing between the successive convolutions thereof, to improve flexibility, and to maximize weight reduction. In accordance with the principles of the present invention, the actuating member is constructed of lightweight polymeric material, such as Delrin whereby to prevent any corrosive adherence between the actuating member and the housing member therefor. By virtue of the flexible characteristics of the linkage assembly of the present invention, said assembly may be used on virtually all types of vehicle doors, thereby providing for universality of application, while satisfying the present safety requirements relating to side impact.

Summary of the invention

This invention relates generally to actuating assemblies and, more particularly, to a new and improved linkage assembly for operatively connecting a remotely located mechanism with an adjacent actuating device or handle.

It is a general object of the present invention to provide a new and improved linkage assembly which finds particularly useful application in operative association with the door handles and latching mechanisms of automotive vehicle doors.

It is a more particular object of the present invention to provide a new and improved lightweight linkage assembly of the above character which is of a relatively flexible construction and therefore will find universality of application.

It is another object of the present invention to provide a new and improved linkage assembly of the above character which comprises an elongated cylindrical actuating member that is operatively supported in a generally helically configured housing member.

It is still another object of the present invention to provide a new and improved linkage assembly as above described wherein one of the members is constructed of a lightweight polymeric resin material whereby to prevent corrosive adherence between the members.

It is yet another object of the present invention to provide a new and improved linkage assembly of the above type wherein the successive convolutions of the housing member are spaced a distance apart sufficient to reduce weight and to permit draining of moisture from within the housing, but which convolutions are spaced sufficiently close to provide guidance for the actuating member in compression.

It is a further object of the present invention to provide a new and improved linkage assembly of the above character which is of an extremely simple design, is easy to assemble and economical to commercially manufacture.

It is yet a further object of the present invention to provide a new and improved linkage assembly of the above character which is of an extremely durable construction and therefore will have a long operational life.

Other objects and advantages of the present invention will become apparent from the following detailed description, taken in conjunction with the accompanying drawing.

Description of the preferred embodiment

Figure 1:
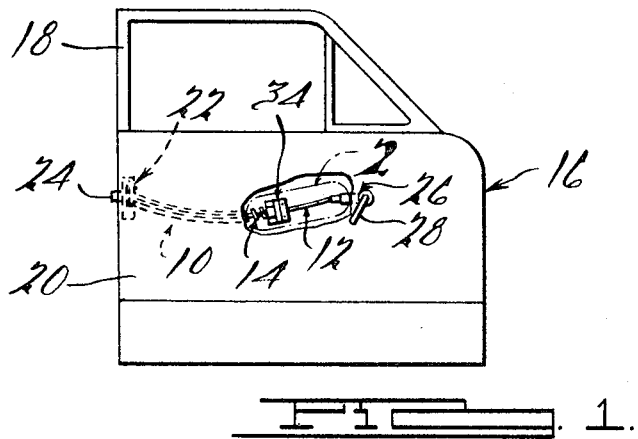
FIGURE 1 is a side elevational view, partially broken away, of a conventional automotive vehicle door having a preferred embodiment of the linkage assembly of the present invention operatively associated therewith.

Although the linkage assembly of the present invention will find wide and diversified use, said assembly is intended to find particularly useful application in operative association with automotive vehicle doors, wherein the assembly functions to provide a mechanical linkage or connection between the interior door handle and the associated door locking or latching mechanism, with the result that preselected pivotal movement of the handle will effectuate unlatching of the door. Accordingly, by way of example, the linkage assembly of the present invention will hereafter be described in such a typical application.

Referring now in detail to the drawing, a linkage assembly 10, in accordance with a preferred embodiment of the present invention, is shown as generally comprising an elongated cylindrically shaped actuating member 12 and a hollow cylindrical housing member 14. The assembly 10 is shown in operative association with a typical automotive vehicle door 16 having an upper window supporting frame section 18 and an enlarged thickness, substantially hollow, lower door section 20. The door 16 is provided with a conventional locking or latching mechanism 22 having a locking member 24 adapted to releasably secure the door 16 in a closed position within a suitable door jamb (not shown) of the associated automotive vehicle. The door 16 is also provided with a latch releasing or actuating handle device 26 having a manually engageable portion 26 which projects toward the interior of the associated vehicle from the position shown in FIGURE 1. As will hereinafter be described in detail, the linkage assembly 10 is adapted to operatively connect the latching mechanism 22 with the actuating device 26, whereby counterclockwise rotational movement of the engageable portion 28 thereof results in the locking member 24 being biased from a latched to a released position, thus permitting the door 16 to be opened.

Figure 2:
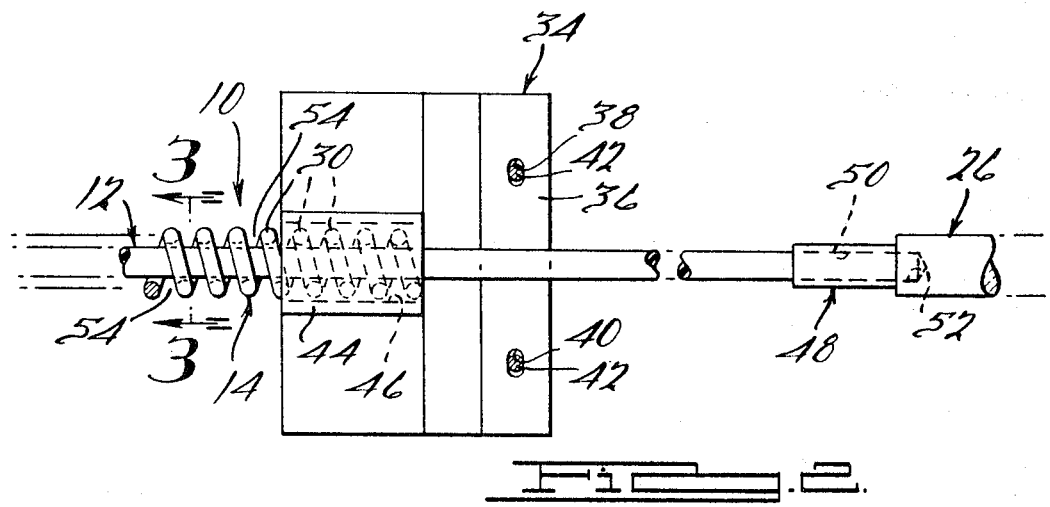
FIGURE 2 is an enlarged side elevational view of the linkage assembly shown within the oval 2 of FIGURE 1.
Figure 3:
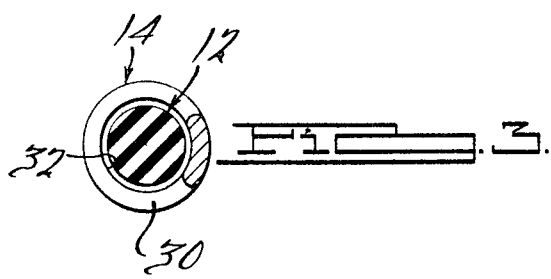
FIGURE 3 is an enlarged transverse cross sectional view taken substantially along the line 3—3 of FIGURE 2.

As best seen in FIGURES 2 and 3, the housing 14 is in the form of an elongated helically configured flexible member comprising a series of uniform diameter, adjacently oriented integrally connected convolutions, generally designated by the numeral 30. The housing convolutions 30 define an elongated cylindrical bore or passage 32 through which the actuating member 12 extends and is slidably disposed. In the preferred construction of the present invention, the bore 32 is slightly larger in diameter than the diameter of the actuating member 12, thereby assuring that the member 12 is free to slide longitudinally within the bore 32 relative to the housing member 14 upon pivotal movement of the handle 28. In a typical operative embodiment of the linkage assembly 10, the diameter of the actuating member 12 is approximately .093 inch, and the diameter of the bore 32 is approximately .105 inch.

In accordance with one of the principles of the present invention, one of the members 12, 14 is fabricated of polymeric resin, while the other of said members is fabricated of a suitable metallic material. With this arrangement, there is no metal-to-metal contact between the members 12, 14 thereby obviating the possibility of any corrosive adherence therebetween. One preferred polymeric resin which has been found to be highly satisfactory is Delrin, this material having the requisite flexible and easily fabricatable characteristics as well as being relatively economical. It will be apparent, of course, that other polymeric resins, as well as other non-corrosive flexible materials, may be utilized in the present invention instead of the aforedescribed preferred material. In a preferred construction of the linkage assembly 10 of the present invention, the actuating member 12 is fabricated of the above described polymeric material and, as such, may be easily molded or formed as by means of well known extrusion techniques.

As best seen in FIGURES 1 and 2, the linkage assembly 1 is adapted to be operatively supported intermediate the opposite ends thereof by means of one or more support brackets, one of which is shown herein and generally designated by the numeral 34. By way of example, the bracket 34 comprises a generally planar mounting plate section 36 which is formed with suitable apertures 38 and 40 and is adapted to be fixedly secured internally of the vehicle door 16 by means of suitable screws, bolts or the like 42 extending through the openings 38, 40. The mounting bracket 34 also comprises a hollow cylindrical collar section 44 defining a central bore 46 within which the housing 14 is nestingly received. Preferably, although not necessarily, the outer periphery of the housing member 14 is clampingly secured within the bore 46 of the mounting bracket 34, whereby to preclude relative longitudinal movement between the housing member 14 and the door 16. It will be readily apparent, of course, that the number of mounting brackets 34 that are provided for operatively supporting the linkage assembly 10 of the present invention will be dependent upon the relative length of the said assembly and the conformation to which it must conform within the door 16.

The opposite ends of the actuating member 12 are adapted to be operatively connected to the actuating handle 26 and the latching mechanism 22 by means of suitable sleeve or fastening members, one of which is shown in FIGURE 2 and generally designated by the numeral 48. The fastening members 48 define axially extending bores 50 with in which the ends of the actuating member 12 are fixedly secured. Means for thus securing the ends of the actuating member 12 within the bores 50 may be provided by suitable locking screws, bolts, or the like (not shown), which may be threadably mounted within suitable radially extending bores formed in the members 50. In the preferred construction of the present invention, the outer peripheries of the fastening members 48 are externally threaded and adapted to be threadably mounted within suitable internally threaded bores 52 formed in the adjacent portions of the actuating handle 26 and latching mechanism 22, as best illustrated in FIGURE 2, whereby to fixedly secure the ends of the actuating member 12 thereto.

In accordance with another of the principles of the present invention, the housing member 14 is constructed so that the adjacent convolutions 30 thereof are spaced longitudinally from one another a predetermined amount. Such spacing of the convolutions 30 provides a series of longitudinally spaced access openings, generally designated 54, which communicate the interior of the bore 32 with the exterior of the housing member 14, which access openings 54 are thereby adapted to permit any moisture which may accumulate or possibly condense within the housing member 14 to drain outwardly therefrom, thus obviating the possibly of such moisture freezing within the housing member 14 and precluding any relative sliding movement of the actuating member 12 relative thereto. By virtue of the fact that in the preferred construction of the present invention, the actauting member 12 is constructed of a polymeric material, the spacing between the adjacent convolutions 30 must be selected so as to not only be sufficiently large to provide for adequate drainage of moisture, but also must be sufficiently small to provide guidance for the member 12. That is, the convolutions 30 must be spaced sufficiently apart to permit adequate draining, yet they must be sufficiently close enough together to prevent the actuating member 12 from becoming deformed when it bears on the inner periphery of the housin convolutions 30. In a typical operative embodiment of the linkage assembly 10 of the present invention, a spacing of approximately .056 inch between the adjacent convolutions 30 has been found to provide for adequate drainage of moisture from within the housing 14, yet prevent any deformation of the actuating member 12.

In operation, it will be seen that when the actuating handle 26 is biased in a clockwise direction in FIGURE 1 the actuating member 12 will move longitudinally toward the right in this figure relative to the housing member 14 and door 16, with the result that the latching member 24 will simultaneously move toward an unlatched position to permit opening of the door 16. After the door 16 has thus been unlatched, the latching member 24, actuating member 12 and handle 28 will be automatically biased to their respective original positions under the influence of some type of positioning or return spring means (not shown) preparatory to the handle 28 being again biased to its own latched position.

It will be seen from the above description that the present invention provides a novel linkage assembly that is of a relatively lightweight flexible construction and, as such, may be easily shaped to accommodate the shape or conformation of the interior of the doors of virtually all types of automotive vehicles, thereby providing universality of application. It will be noted, of course, that use of the linkage assembly 10 of the present invention is not intended to be limited merely to the application hereinabove described, but instead, the assembly 10 will find widely varied use in virtually all types of industries. It will also be noted that by virtue of the simple design of the linkage assembly 10 of the present invention, said assembly may be easily installed, economically manufactured and will have a long and effective operational life.

While it will be apparent that the preferred embodiment herein illustrated is well calculated to fulfill the objects above stated, it will be appreciated that the linkage assembly 10 of the present invention is susceptible to modification, variation and change without departing from the proper scope or fair meaning of the subjoined claims.

I claim:
1. In a linkage assembly for operating a remotely located mechanism in response to preselected movement of an actuating device,
    an elongated cylindrically configured actuating member of polymeric material extending between said mechanism and said actuating device, means operatively connecting one portion of said actuating member to said mechanism and another portion of said member to said actuating device, and
    means for operatively supporting said actuating member including an elongated helically configured housing member disposed in surrounding relationship with respect to said actuating member,
    said housing member comprising a series of helical convolutions spaced close enough together to provide guidance for said actuating member in compression yet being spaced apart a sufficient distance to minimize weight and permit moisture to drain from within said housing.

2. An assembly as set forth in claim 1 wherein said actuating member is fabricated of Delrin.

3. An assembly as set forth in claim 2 wherein said housing member is fabricated of galvanized wire.

4. An assembly as set forth in claim 1 wherein said helical convolutions of said housing member are spaced between .040 and .070 inch apart.

5. The invention as set forth in claim 1 which includes a door latching mechanism, a door actuating handle, wherein said actuating member is fixedly secured at one end to said handle and at the opposite end thereof to said latching mechanism, and which includes support bracket means intermediate said latching mechanism and said handle for operatively supporting said housing member.

References Cited
UNITED STATES PATENTS

| | | | |
|---|---|---|---|
| 1,356,293 | 10/1920 | Klinger | 74—503 |
| 1,401,744 | 12/1921 | Watson | 74—503 |
| 2,751,796 | 6/1956 | Sandberg | 74—503 |
| 3,003,275 | 10/1961 | Reld | 43—18 |
| 3,048,432 | 8/1962 | Harter | 43—18 |
| 3,113,798 | 12/1963 | Kramer | 74—503 |
| 3,176,097 | 3/1965 | Wood | 74—503 |
| 3,229,977 | 1/1966 | Guglielmo | 273—80 |

FRED C. MATTERN, Jr., Primary Examiner

W. S. RATTIFF, Jr., Assistant Examiner

U.S. Cl. X.R.

43—18; 273—80